United States Patent [19]

Nakagawa et al.

[11] Patent Number: 4,472,056
[45] Date of Patent: Sep. 18, 1984

[54] SHAPE DETECTING APPARATUS

[75] Inventors: Yasuo Nakagawa; Hiroshi Makihira, both of Yokohama; Souhei Ikeda; Satoru Ezaki, both of Hadano; Osamu Harada, Odawara, all of Japan

[73] Assignee: Hitachi, Ltd., Tokyo, Japan

[21] Appl. No.: 286,068

[22] Filed: Jul. 23, 1981

[30] Foreign Application Priority Data

Jul. 23, 1980 [JP] Japan .................................. 55-99979
Oct. 9, 1980 [JP] Japan ................................ 55-140611

[51] Int. Cl.$^3$ ............................................ H04N 7/18
[52] U.S. Cl. .................................... 356/376; 356/398; 358/107
[58] Field of Search ....................... 356/376, 381, 398; 358/101, 107, 293

[56] References Cited

U.S. PATENT DOCUMENTS

| | | | |
|---|---|---|---|
| 3,794,427 | 2/1974 | Shibata et al. ....................... | 356/398 |
| 3,976,382 | 8/1976 | Westby ............................... | 356/376 |
| 4,105,925 | 8/1978 | Rossol et al. ........................ | 356/376 |
| 4,112,469 | 9/1978 | Paranjpe et al. .................... | 358/293 |
| 4,188,544 | 2/1980 | Chasson .............................. | 356/376 |
| 4,305,096 | 12/1981 | Yokoshima et al. ................ | 358/101 |

OTHER PUBLICATIONS

Simms, "The Application of CCD's to Document Scanning", *Microelectronics*, vol. 7, No. 2, pp. 60-63 (Dec. 1975).

*Primary Examiner*—R. A. Rosenberger
*Attorney, Agent, or Firm*—Antonelli, Terry & Wands

[57] ABSTRACT

Disclosed is a shape detecting apparatus comprising a slit projector for projecting a slit bright line on a number of objects arrayed in a line, an image forming lens for forming the bright line image, an image scanning mechanism for the bright line image formed through the image forming lens in a height direction of the object and a one-dimensional image sensing device for self-scanning the bright line image formed therein with an array of image sensing elements orthogonal to the scanning direction by the image scanning mechanism.

6 Claims, 24 Drawing Figures

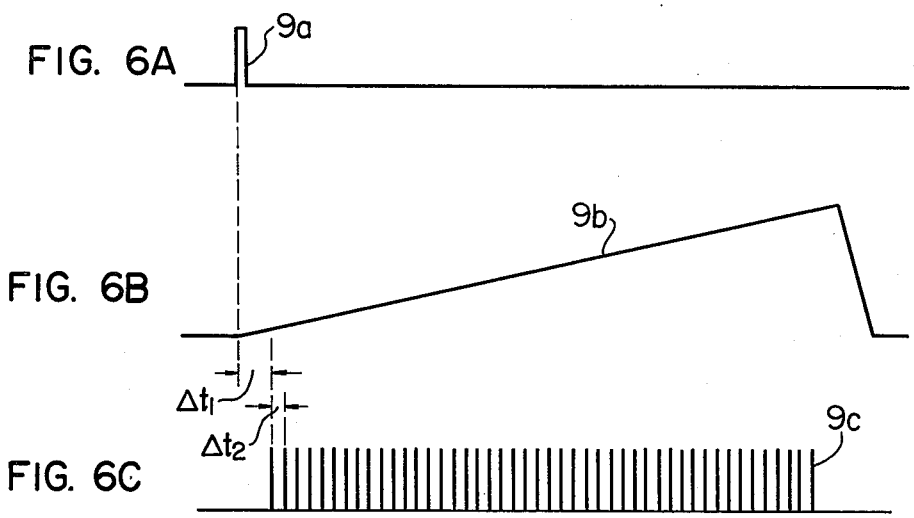
FIG. 5
FIG. 6A
FIG. 6B
FIG. 6C
FIG. 6D
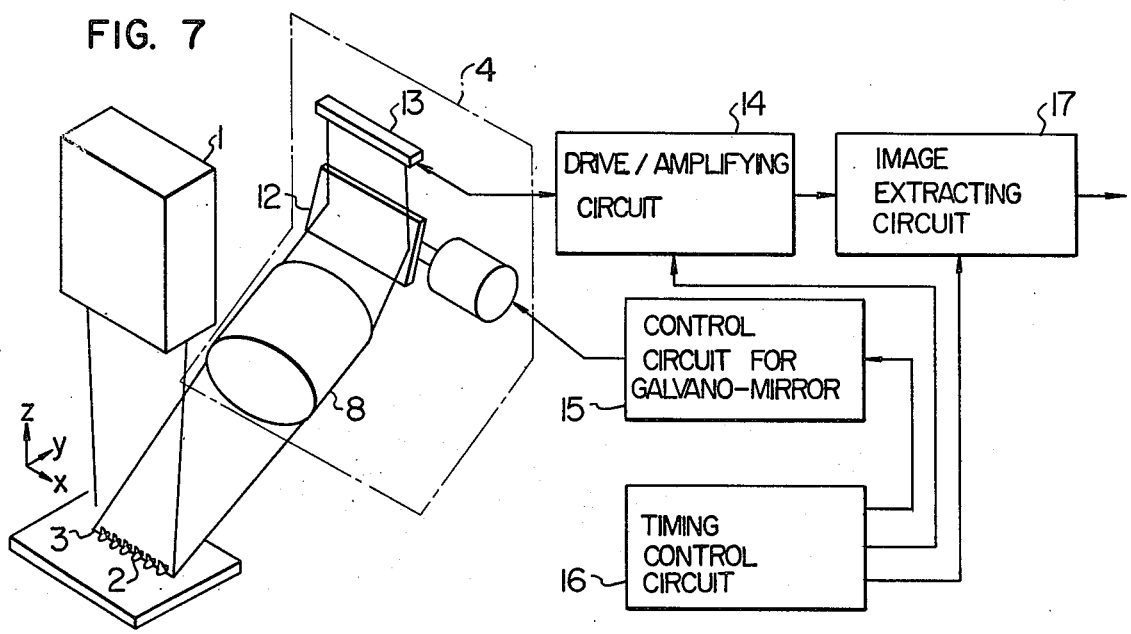
FIG. 7

SHAPE DETECTING APPARATUS

BACKGROUND OF THE INVENTION

The present invention relates to a shape detecting apparatus for optically detecting three-dimensional products or parts such as soldered areas of a printed circuit board, parts attached to the printed board, and bumps in an LSI bonding process.

An apparatus for optically detecting a three-dimensional shape is disclosed in a copending U.S. patent application Ser. No. 181,768 filed on Aug. 27, 1980, U.S. Pat. No. 4,343,553 which is assigned to the same assignee as the present patent application. The apparatus of the copending application is arranged such that an image of an object to be detected by a light segmenting method in which the object is illuminated by a slit light extending in a direction of the width of the object is formed on a storage type solid state image sensing device and a plane image of the light-segmented part of the object is obtained by combining the scanning of the object by the slit light in its height direction and the scanning of the image formed in the image sensing device in its width direction. The apparatus of the copending application has no problem when the object under examination is relatively small and a detecting field of view is narrow. When a large detecting field of view is required, that is, the object is large in size or a number of objects must simultaneously be detected, however, a detecting speed of the image sensing device is slow and its detecting time is longer in order to obtain a high sensitivity of the image detection, while the sensitivity of the image detection is reduced, in order to carry out the detection in a shorter time.

In the above shape detecting apparatus, the slit projector and detector are secured to each other so as to be kept positionally unchanged relative to each other. A slit light projected from the slit projector is narrowest at a cross point of an optical axis of the slit projector and an optical axis of the image detector, and a focal point of the image detector is coincident with the cross point. With this arrangement, when the object lies at the cross point, a shape of the object can be most clearly obtained.

However, the object does not always lie at the cross point depending on its size or shape, for example, a warp of a printed circuit board of which mounted parts or soldered portions are to be detected. This brings about a problem of an out-of-focus.

SUMMARY OF THE INVENTION

Accordingly, an object of the present invention is to improve a detecting apparatus of the type as disclosed in the copending application and to provide a shape detecting apparatus capable of providing a high sensitivity and a fast detection time even if the detection is carried out with a wide field of view.

Another object of the present invention is to eliminate the disadvantages of the prior art and to provide a shape detecting apparatus which can detect a shape of an object with high accuracy by incorporating a function of automatically compensating for a displacement of the object.

The present invention is based on the fact that a sensitivity of the storage type image sensing element depends on a time interval between successive two detections of video signals through a sensing element, and that as the time interval is longer, the sensitivity is higher. In the present invention, a one-dimensional image sensing device is arranged substantially in parallel with a slit image so as to detect the slit image on a line extending in its longitudinal direction (X-direction) and the image is optically scanned in a direction (Z-direction) orthogonal to the longitudinal direction of the device. A shape waveform is immediately produced by a shape extracting circuit comprising three random access memories for storing a maximum value of the video signal detected by a given point of the image sensing device (represented by a given X-coordinate) during one optical scan in the Z-direction, a scanning distance in the Z-direction (represented by a corresponding Z-coordinate) where the maximum value is first detected at the given point and another scanning distance in the Z-direction where the maximum value expires at the point.

The present invention has also features in that the brightest point in each scanning line is detected by an image detector and the brightest points obtained from the repeated scanning lines are used to provide a histogram with respect to the height of the image and that the positional relationship between the light segmenting detection head composed of a slit light projector and image detector and the objects is automatically changed so as to locate the peakpoint of the histogram at a predetermined position.

BRIEF DESCRIPTION OF THE DRAWINGS

FIG. 5 is a light segmented image of the plurality of the objects.

FIGS. 6A to 6D illustrate scanning timings and scanning directions of the apparatus shown in FIG. 4.

FIG. 7 shows, by way of schematic and block diagram, an embodiment of a shape detecting apparatus according to the present invention.

DESCRIPTION OF THE PREFERRED EMBODIMENTS

Figure 1:
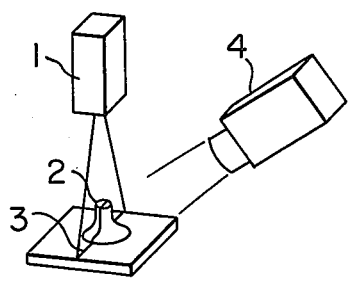
FIG. 1 shows a schematic diagram of an apparatus using the light segmenting method.
Figure 2:
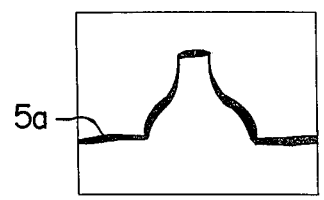
FIG. 2 is a graphical representation of a light segmented image detected.

Before proceeding with a description of the present invention, a light segmenting method used in the present invention will be described for better understanding of the present invention. Referring to FIG. 1, there is shown an apparatus using the light segmenting methods to which the present invention is applied. In FIG. 1, slit light is projected from a slit projector 1 to an object 2, from above. A solid line 3 indicates a slit light on the object 2. Actually, the solid line 3 is detected as a bright line distinguished from the background. When the solid line 3 is obliquely observed by means of an image detector 4, its detected image 5a presents a shape of the object 2, as shown in FIG. 2, the detected image 5a illustrated dark is actually an image delineated by a bright line.

Figure 3:
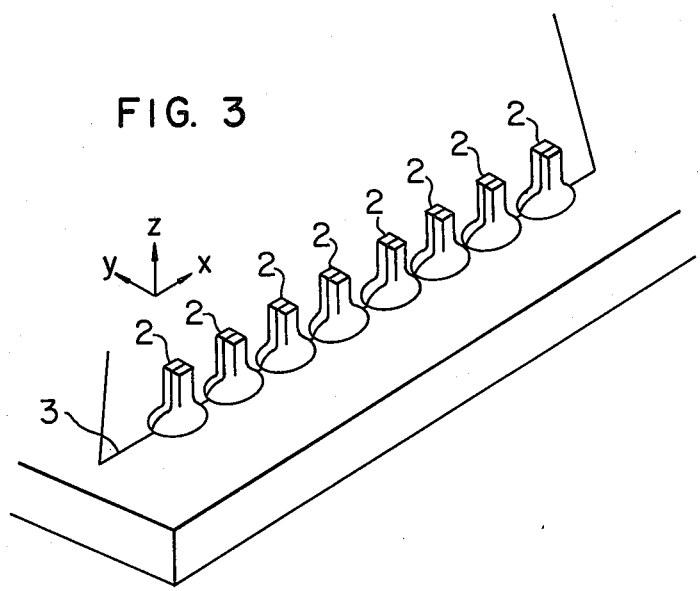
FIG. 3 is a schematic diagram of an example for simultaneously observing a plurality of objects.
Figure 4:
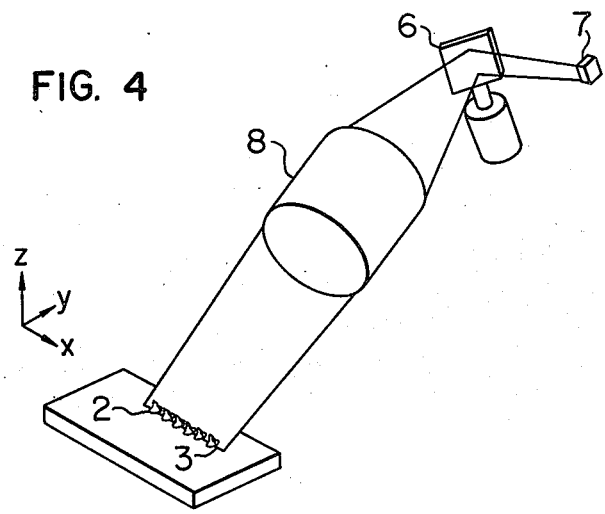
FIG. 4 is a schematic diagram of a shape detecting apparatus.

In applying the light segmenting method to an industrial instrumentation or an automatic inspection of a shape of an object such as an industrial product, there often occurs such cases as desired to simultaneously detect a number of objects by a set of the slit light and the image detector or desired to obtain a wider field of view in the light segmenting method. FIG. 3 illustrates soldered portions on a printed circuit board, as an example of such cases, particularly a series of soldered portions of IC leads of the dual package type. For simultaneously detecting the shapes of the portions a in this case, all of the objects are simultaneously illuminated by a long slit light 3 and detected in the sideway direction. The image detected by this is a narrow image extending horizontally. An arrangement of the detecting head for detecting such a narrow image is illustrated in FIG. 4 and similar to that disclosed in the coopending application. An image sensor 4 is comprised of an image forming lens 8, a galvano-mirror 6, and a one-dimensional image sensing device 7 composed of a plurality of image sensing elements arranged in a row extending in the Z-direction. In operation, the galvano-mirror 6 is driven for ramp mode angular movement to scan an image in the X-axis direction, while at the same time the one-dimensional image sensing device 7 located at a real image focusing surface of the image forming lens 8 is self-scanned. At any instant during the scanning by the mirror, the image sensing device 7 produces a video signal of the image on a line extending in the Z-axis direction at an X-coordinate where the scanning reaches at that instant when the scanning is completed, a two-dimensional image 5b as shown in FIG. 5 is obtained. Scanning timing in this case is illustrated in FIGS. 6A to 6D. Specifically, upon issuing of a detection start signal 9a shown in FIG. 6A, a scanning signal 9b is produced to start the scanning in the X-axis direction shown in FIG. 6B. The X-axis scanning is made by driving the galvano-mirror 6, in the case of FIG. 4. In the case using such a galvano-mirror 6, it takes a certain time interval before the mirror 6 begins regular ramp-mode scanning. Therefore, a delay time $\Delta t_1$ is provided after the detection start signal 9a is issued and then start signals 9c for the Z-axis scanning shown in FIG. 6C are successively produced, so that the self scanning of the one-dimensional device 7 is repeated in the direction of Z-axis, whereby to detect the image. Those scannings with respect to the image are shown in FIG. 6D, in which reference numeral 10 designates the Z-axis scanning on the one-dimentional image sensing device and reference numeral 11 designates the X-axis scanning by the galvano-mirror. The light segmenting method as mentioned above is generally advantageous in that it can detect an image considerably elongating in the X-axis direction. In this method, however, when a usual storage-type solid-state image sensing element is used for each element constituting the one-dimensional image sensing device, the signal-to-noise ratio S/N and the image sensitivity of each element depend on its storage time. In order to obtain a sufficient storage time, a clock frequency for the Z-axis scanning 10 of the image sensing device must be made low so that the time interval $\Delta t_2$ shown in FIG. 6C is long, resulting in a considerably long time for sensing an image composed of a large number of picture elements. Conversely, in order to realize a high speed image sensing, the storage time must be short thereby failing to give a sufficient sensitivity.

An embodiment of the present invention, which can successfully overcome the above-mentioned disadvantages, is illustrated in FIG. 7. As shown, the present embodiment is comprised of a slit projector 1, an image forming lens 8 for detecting obliquely and sideways a slit image 3 formed on objects 2 to form a detected image, a galvano-mirror 12 for scanning the detected image in a direction orthogonal to the direction in alignment of the objects 2, a one-dimensional image sensing device 13 disposed at a plane on which a real image of the array of the objects 2 is formed by the lens 8 and composed of a plurality of image sensing elements arranged in a row extending in the X-direction corresponding to the direction in alignment of the objects as viewed on the real image, a circuit 14 for driving the one-dimensional image sensing device and for amplifying the detected video signal, a control circuit 15 for the galvano-mirror, a timing control circuit 16 for controlling the timings of the scannings of the galvano-mirror and the one-dimensional image sensing device, and an image extracting circuit 17. When compared with the shape detecting apparatus shown in FIG. 4, this embodiment has distinctive features in that the one-dimensional image sensing device 13 is disposed substantially in parallel with the slit image 3 and a rotating shaft of the galvano-mirror 12 is substantially in parallel with the direction in alignment of the objects 2.

Figure 8:
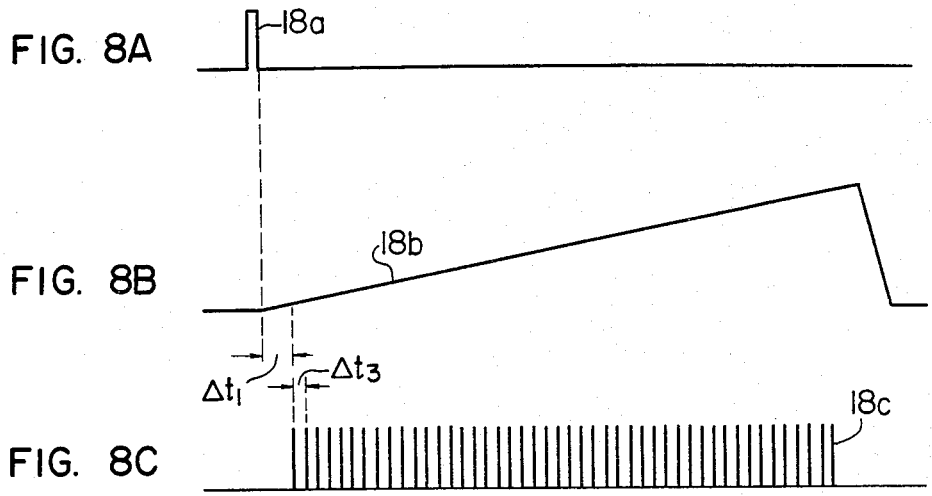
FIGS. 8A to 8F diagramatically illustrate scanning times, scanning directions, and a shape detection of the apparatus shown in FIG. 7.

In FIG. 7, a slit light is projected from the slit projector 1 onto the array of the objects 2, so that a slit bright line 3 is formed on the array of the objects 2. The slit bright line 3 is detected by the image forming lens 8. The one-dimensional image sensing device 13 is disposed on the real image focussing surface of the image forming lens 8. The real image is scanned by means of the galvano-mirror 12 in a height direction (Z-axis direction) of the object. The self-scanning direction of the one-dimensional image sensing device 13 is coincident with the X-axis direction. The two scannings are combined to form a two-dimensional scanning. An image formed by the one-dimensional image sensing device 13 is shown in FIG. 8D. The timing control circuit 16 controls the scanning timing of the galvano-mirror 12 and that of the one-dimensional image sensing device 13. The timing diagrams are illustrated in FIGS. 8A to 8C.

In response to a sensing start signal 18a shown in FIG. 8A which is applied to the timing control circuit 16 from a suitable external device (not shown), the timing control circuit 16 applies to the galvano-mirror control circuit 15 a start signal 18b for the ramp scanning shown in FIG. 8B. After a time delay $\Delta t_1$ sufficient to have the galveno-mirror 12 moved for its regular ramp-mode scanning with linear inclination, the timing control circuit 16 applies to the drive circuit 14 scanning start signals 18c to start the X-axis self-scanning by the one-dimensional image sensing device 7 as shown in FIG. 8C at given constant intervals $\Delta t_3$. Under this condition, the scanning 19 by the one-dimensional image sensing device 13 is performed in the longitudinal direction (X-axis direction) of the sensed image, while the scanning 20 of the galvano-mirror is in the lateral direction (Z-axis direction).

A video signal thus obtained can directly be observed by a synchroscope or the like. A shape of the objects 2 is obtained from the shape extracting circuit 17. The shape obtained can be observed by a synchroscope or the like, and also be counted or inspected automatically. In FIG. 7, there is omitted in illustration a minitoring device such as the synchroscope, the automatic counting device, the automatic inspection device, or the like, for simplicity of illustration.

Figure 9:
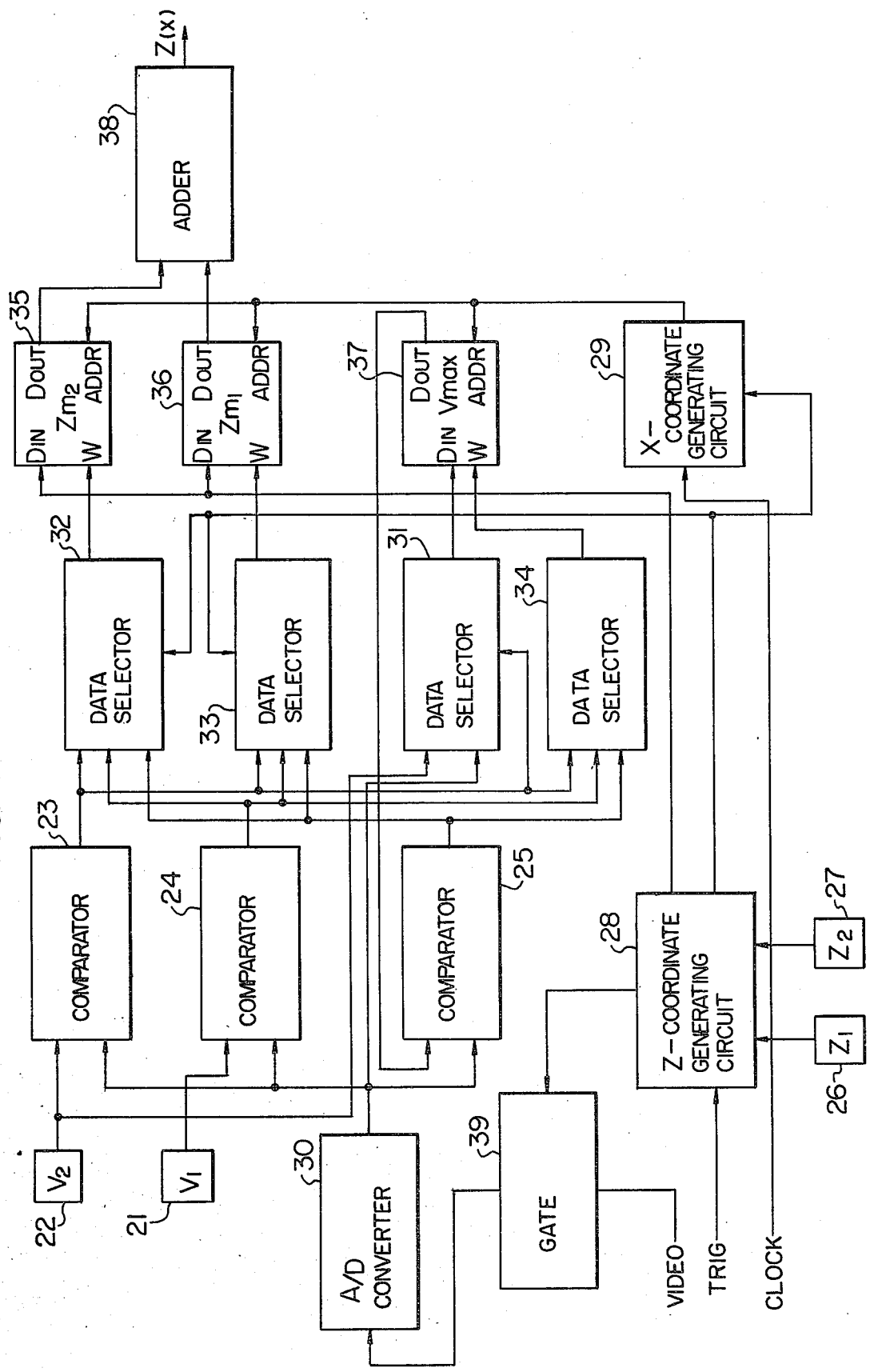
FIG. 9 shows a block diagram of a detail of a shape extracting circuit shown in FIG. 7.
Figure 10:
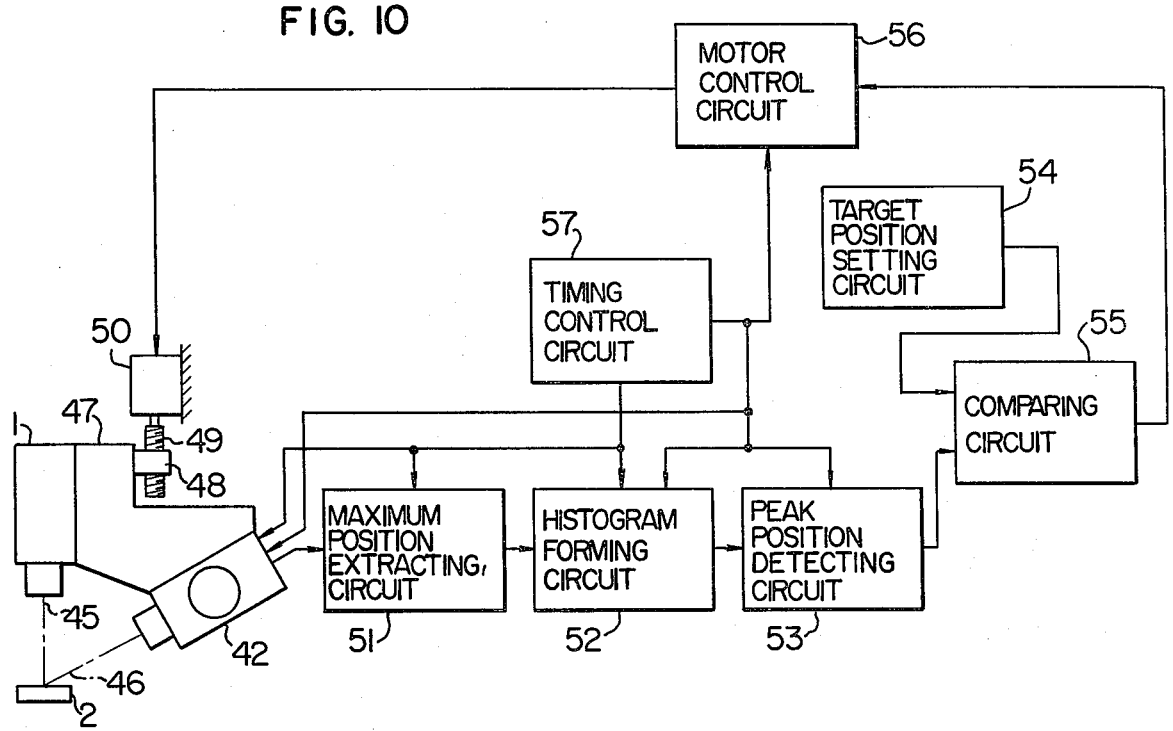
FIG. 10 is a block diagram of another embodiment of a shape detecting apparatus of the present invention.

FIG. 9 shows an embodiment of the shape extracting circuit 17 in the present invention. The shape extracting circuit 17 receives a video signal VIDEO produced from the one-dimensional image sensing device 13, a trigger signal TRIG, and a clock signal CLOCK, and produces a shape waveform z(x) extracted. The extracting circuit 17 is comprised of digital switches 21 and 22 for setting levels $V_1$ and $V_2$, comparators 23, 24 and 25, digital switches 26 and 27 for setting coordinates $Z_1$ and $Z_2$, a Z-coordinate generating circuit 28, an X-coordinate generating circuit 29, an A/D converter 30, a data selector 31, read/write control circuits 32, 33 and 34, $Zm_1$, $Zm_2$ and Vmax random access memories 35, 36 and 37, an adder 38, and a gate 39. The three random access memories 35, 36 and 37, each including memory addresses whose number is corresponding to the number of picture elements or sensing elements of one-dimensional image sensing device 13, store the maximum value Vmax of the video signal obtained by each sensing element during the Z-direction scanning, the Z-coordinate $Zm_1$ where the video signal VIDEO first reaches the maximum value Vmax and Z-coordinate $Zm_2$ where the maximum value Vmax expires in the sensing element. This process will be better understood by FIGS. 8E and 8F. Each sensing element gives a video signal, as shown in FIG. 8F, corresponding to the elongated narrow portion 13a extending in the direction 20, as shown in FIG. 8E, during the Z-direction scan by the mirror. In the video signal detected by the element, Vmax appears at Z-coordinate $Zm_1$ and expires at $Zm_2$. Thus, Vmax, $Zm_1$ and $Zm_2$ are stored in the respective addresses allotted to the element of the three random access memories. Before the start of the shape detection, those memories are all cleared to zero. The shape detection is performed only over an interval from $Z_1$, to $Z_2$ of the entire scanning range in the Z-axis direction by the galvano-mirror. The coordinates $Z_1$ and $Z_2$ are preset by the digital switches 26 and 27, respectively. Where $Z_1 < Z_2$. When VIDEO $<V_2$ is established within the interval [$Z_1$, $Z_2$] in an element, the shape extracting circuit 17 produces the Z-coordinate value upon detecting the maximum value of the video signal satisfying VIDEO$>V_1$ and produces "0" upon detecting the video signal satisfying VIDEO$\leq V_1$. If it detects the video signal satisfying VIDEO$\geq V_2$ within the interval [$Z_1$, $Z_2$], then it produces produces an average value of the Z-coordinate $Zm_1$ for the first VIDEO$=V_2$ and the Z-coordinate $Zm_2$ for the last VIDEO$=V_2$. If the maximum value of the video signal VIDEO appears at two or more Z-coordinates under a condition that VIDEO$<V_2$ and $V_1<$VIDEO, that is, the maximum value exists at a plurality of the Z-coordinates, the shape extracting circuit 17 produces the average value of $Zm_1$ and $Zm_2$ of the first and last detected maximum values. The values $V_1$ and $V_2$ are previously set, by the digital switches 21 and 22 with a relation $V_1<V_2$. The reason why an average value of the Z-coordinates where VIDEO$=V_2$ is used for the video signal exceeding $V_2$ is that, when the sensed light segmented image is excessively bright locally, the one-dimensional image sensing element 13a is saturated at the excessively bright portion to possibly exhibit asymmetrical characteristic with respect to the location where the video signal is at its maximum value, thereby failing to determine a correct maximum value location. The reason why when VIDEO$\leq V_1$ in the interval [$Z_1$, $Z_2$] the value 0 is produced is that when the field is too dark, noise may erroneoxsly be detected as a light segmented image and such erroneous detection must be prevented.

In the circuit of FIG. 9, the scanning of the galvanomirror 12 starts and, after time $\Delta t_1$, the trigger signal TRIG is inputted to the Z-coordinate generating circuit 28. The Z-coordinate generating circuit 28 counts the trigger signal to produce the Z-coordinate Z. When $z \geq Z_1$, the gate 39 is opened to allow the video signal VIDEO to be A/D-converted by the A/D converter. The comparator 23 compares the digital video signal VIDEO with the voltage $V_2$ set by the digital switch 22. The comparator 24 compares the digital video signal VIDEO with the voltage $V_1$ set by the digital switch 21. The comparator 25 compares the digital video signal VIDEO with the voltage Vmax. The digital video signal VIDEO changes with incoming clock signals of a number corresponding to the X-coordinate, which follow the trigger signal TRIG. The X-coordinate is generated by the X-coordinate generating circuit 29 by counting the clock signal CLOCK. The X-coordinate generated is corresponding to an associated one of the addresses of the $Zm_1$, $Zm_2$ and Vmax random access memories 35, 36, and 37. Accordingly, the Vmax in the comparator 25 is the Vmax in the Z-axis direction at the X-coordinate corresponding to the counts of the clock at that time. In other words, the digital video signal VIDEO(x) is compared with the Vmax(x) at a given X-coordinate. When the comparison of VIDEO with $V_1$, $V_2$, and Vmax indicates (1) VIDEO$<V_1$ or VIDEO$<$Vmax (representing the video signal VIDEO falling off from the voltage Vmax), all of the read/write control circuits 32, 33 and 34 are not operated, while, when it indicates (2) VIDEO$\geq V_1$, VIDEO$<V_2$ and VIDEO$>$Vmax, the read/write control circuits 32, 33 and 34 operate to write the video signal VIDEO at that time into the random access memory 37 and the respective Z-coordinates outputted from the Z-coordinate generating circuit 28 at that time into the $Zm_1$ and $Zm_2$ random access memories 36 and 35. When VIDEO$=$Vmax is held, only the read/write control circuit 32 operates to write the Z-coordinate at that time into the $Zm_2$ random access memory 35. Finally, when the VIDEO signal falls off and is not equal to $V_2$, the Z-coordinate $Zm_2$ is stored into the $Zm_2$ random access memory 35. When VIDEO$\geq V_2$, the read/write control circuits 32 and 34 operate to write the Z-coordinate at that time into the $Zm_2$ random access memory 35 and "$V_2$" into the Vmax random access memory 37 through the data selector 31. When the VIDEO signal drops and hence the relation VIDEO$=V_2$ does not hold, $Zm_2$ of the Z-coordinate is stored in the $Zm_2$ random access memory 35. At the same time, $V_2$ is stored in the Vmax random access memory 37. Therefore, the read/write control circuits 32, 33 and 34 do not operate.

Thus, when $V_1 \leq $ VIDEO $< V_2$, the Z-coordinate of $Zm_1$ corresponding to the leading edge of the video signal representing the maximum value Vmax is stored into the $Zm_1$ random access memory 36, and the Z-coordinate of $Zm_2$ corresponding to the trailing edge is loaded into the $Zm_2$ random access memory 35. If the maximum value Vmax appears on only one picture element in the Z-axial direction, it indicates $Zm_1 = Zm_2$.

When $V_2 \leq$ VIDEO, the Z-coordinate $Zm_1$ representing the leading edge of $V_2$ is stored into the $Zm_1$ random access memory 36 and the Z-coordinate $Zm_2$ for the trailing edge is loaded into the $Zm_2$ random access memory 35. If $V_2$ appears on only one picture element in the Z-direction, it indicates $Zm_1 = Zm_2$.

The above-mentioned operation is successively repeated till the scanning reaches the Z-coordinate of $Z_2$ and then the process proceeds with the next step. That is, for such an X-coordinate (corresponding to one element of the one-dimensional image sensing device) on which VIDEO$>V_1$ appears but not VIDEO$>V_2$ during the process, the Z-coordinates $Zm_1$ and $Zm_2$ corresponding to the leading and trailing edges of the Vmax are respectively stored into the $Zm_1$ and $Zm_2$ random access memories 36 and 35. For such an X-coordinate on which VIDEO$>V_2$ appears, the Z-coordinate $Zm_1$ where the video signal first rises to VIDEO$>V_2$ is stored into the $Zm_1$ random access memory 36 and the Z-coordinate $Zm_2$ where the video signal VIDEO last goes to VIDEO$<V_2$ is stored into the $Zm_2$ random access memory 35.

After the process is completed, a command from the Z-coordinate generating circuit 28 closes the gate 39 and sets the X-coordinate generating circuit 29 to $Z_1$. Then, the Z-coordinate generating circuit 28 gives a command for making an increment of the X-coordinate to the X-coordinate generating circuit 29 while at the same time gives to the read/write control circuits 32 and 33 a read command to make an access to the $Zm_2$ random access memory 35 and the $Zm_1$ random access memory 36. As a result, the contents of the random access memories 35 and 36 are applied to the adder 38 which in turn calculates an average value of those contents.

In this way, the adder 33 produces a signal representative of a cross sectional configuration of the object.

In the above-mentioned embodiment, the one-dimensional image sensing element may be composed of any type having a storage effect, for example, a solid-state image sensing element such as a photodiode array (MOS type), CCD, CCPD or the like, or a TV camera which suppresses the vertical synchronization.

In FIG. 7, the galvano-mirror is used for scanning the image in the Z-axis. The galvano-mirror may be replaced by any means if it can scan an optical image, such as a parallel rotating prism, the scanning of other prisms, or a rotating polyhedral mirror.

When a luminosity of the slit image detected in FIG. 9 is below a saturation level of the one-dimensional image sensing device, there is no need for setting the $V_2$. In this case, the circuit components 22, 23, 31, 32, 35 and 38 are unnecessary. This is not illustrated in the embodiment but the arrangement not using the $V_2$ setting and its associated circuitry is of course involved in the present invention.

As seen from the foregoing description, the shape detecting apparatus of the present invention can detect the shape of the objects at much higher speed without any deterioration of its detecting accuracy compared to the prior apparatus. Also in a case where the detecting speed is not important, it is allowed to have a sufficiently long trigger time of the one-dimensional image sensing device. Therefore, the shape of the objects can be detected with extremely high accuracy. In typical industrial instrumentation, the X-direction scanning is repeated 10 to 100 times in each Z-direction scanning and by the present invention, the shape detecting speed and the sensitivity can be improved 10 to 100 times of those of the prior apparatus.

The present invention can immediately extract and produce a shape of objects from the video signal obtained by the above-mentioned shape detecting apparatus and produces a multi-tone two-dimensional image obtained by the light segmenting method in the form of a one-dimensional waveform. Therefore, the present invention can provide a waveform which is effective for monitoring, and automatically measuring or inspecting a shape of an object or objects.

An apparatus for detecting a shape of the object in an in-focus condition and at high sensitivity will be described referring to FIGS. 10 and 11A to 11F. The shape detecting apparatus is comprised of a head moving mechanism including a slit projector, an image detector 42, a detecting head section 47 for fixing them, a feed screw 49 and a nut 48, a peak value position extracting circuit 51, a histogram forming circuit 52, a target position setting circuit 54, a comparing circuit 55, a motor control circuit 56 and a timing control circuit 57. Although not shown in FIG. 10, the detecting head section 47 needs a sliding mechanism for preventing a transverse vibration when the detecting head section 47 moves up and down as viewed in the drawing of FIG. 10. The image detector 42 may be any type, if it is capable of converting an optical image formed by an image forming lens into a corresponding electrical signal, such as a detector adapted to take a real image obtained through an image forming lens by a TV camera, a detector to take it by means of a rotating polyhedral mirror for scanning the detected real image or the combination of a galvano-mirror and an one-dimensional solid state image sensing device, or a detector adapted to take it by the combination of a couple of galvano-mirrors for scanning the detected real image and a photomultiplier tube.

Figure 11A:
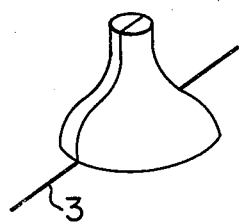
FIGS. 11A to 11F illustrate the operation of the shape detecting apparatus shown in FIG. 10.
Figure 11B:
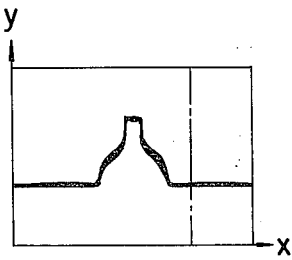
Figure 11C:
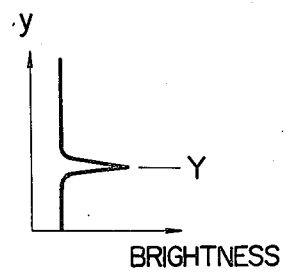
Figure 11D:
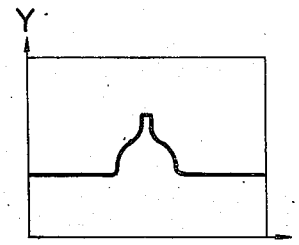
Figure 11E:
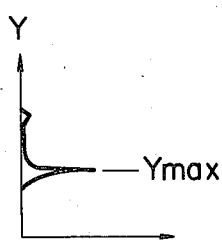
Figure 11F:
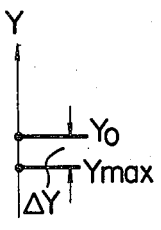

The operation of the present embodiment follows. FIG. 11A shows a soldered portion on a printed circuit board as an example of an object to be detected. In the figure, a bold line indicates a slit bright line 3. When this bright line is detected by means of the image detector 42 obliquely and sideways, an image as shown in FIG. 11B is detected. Let longitudinal or vertical and lateral or horizontal directions of the image be y and x, respectively. A video signal of the image is plotted as shown in FIG. 11C. As shown, a slit image portion Y of the video signal is brightest (high in amplitude) and the remaining portion is dark (low). A position Y of the maximum value of the video signal in each of the y scanning is detected by the maximum value position detecting circuit 11. FIG. 11D shows, by way of example, a Y-x graphical representation obtained as mentioned above. The histogram extracting circuit 52 receives, as an input signal, the maximum value position Y with respect to each x, and forms a frequency distribution of the position Y, i.e. a histogram, as shown in FIG. 11E. The peak position detecting circuit 53 obtains a peak position Ymax from the histogram, after the scanning of one frame, i.e. the formation of the histogram. The comparator 55 compares the detected Ymax and an infocus position Y preset by the target position setting circuit 14 (the Ymax value when the object is located at a cross point of the optical axes 45 and 46 of the slit projector and the detector), thereby obtaining a difference $\Delta Y$ between them as shown in FIG. 11F. The motor control circuit 56 receives the difference $\Delta Y$ to rotate the motor 50 so as to shift the head 47 by $-\Delta Y$ so that Ymax=Yo.

The timing control circuit 57 controls the timings in the operations of the above-mentioned circuits; the y scanning of the image detector 42 and the operation of the maximum value detecting circuit 11 in synchronism with the y scanning, the operation of the histogram forming circuits 52, the x scanning of the image detector 42 and the operation of the peak position detecting circuit 53 in synchronism with the x scanning, the drive command timing of the motor control circuit 56, and clearing of the histogram forming circuit 52.

In the above-mentioned embodiment, the target position setting circuit 54 uses merely a register. A digital switch or the like may be used to this end. Alternatively, the object is located at the cross point of the optical axes 45 and 46, and the Ymax at that time is obtained by the peak position detecting circuit 53, and then set in the register.

The feedback loop may be constantly operated so as to have Ymax=Yo through its continuous control, or it may be operated by an external command only when the Ymax=Yo control is necessary.

While the present embodiment moves up and down the detecting head, the object, instead of the detecting head, may be moved in the same manner. The circuits 11 to 16 may entirely or partially be constructed of a microprocessor or an electronic computer and in this case, their functions are realized by a proper software.

As seen from the foregoing description, in case where the object is relatively displaced from the detecting head, the displacement can automatically be corrected, with the result that a shape of the object can always be detected with a clear image, thereby improving the workability remarkably.

We claim:

1. A shape detecting apparatus comprising:
   a slit projector for projecting a slit-like bright line on a plurality of objects arranged in a line;
   an image forming lens for forming a bright line image from said slit-like bright line;
   image scanning means for scanning the bright line image obtained through said image forming lens in a direction of the height of said objects;
   a one-dimensional image sensing device having a plurality of image sensing elements arranged in a direction perpendicular to the scanning direction of said image scanning means, including means for self-scanning said bright line image formed by said image forming lens by scanning said plurality of image sensing elements in said perpendicular direction;
   a Z-coordinate generating circuit for generating a Z-coordinate in a direction of the height of said object on the basis of a trigger signal of said one-dimensional image sensing device;
   an A/D converting circuit for A/D converting a video signal obtained from said one-dimensional image sensing device; and
   memory means for storing a Z-coordinate obtained from said Z-coordinate generating circuit corresponding to each X-coordinate representing the image sensing elements of said one-dimensional image sensing device, said Z-coordinate representing a maximum value of the video signal at said each X-coordinate, which is obtained by means of searching from the digital video signal A/D converted by said A/D converting circuit, whereby a contour of each of the objects is detected from the Z-coordinate corresponding to each X-coordinate produced from said memory means,
   said apparatus further comprising:
   a histogram forming means for forming for each frame a frequency distribution of the Z-coordinate representing the maximum value of the video signal at said each X-coordinate;
   a peak position detecting means for detecting a peak Z-position which provides a maximum in said frequency distribution formed by said histogram forming means; and
   automatic control means for relatively moving a light segmented-image detecting head comprising said image forming lens, image scanning means, and the one-dimensional image sensing device, with respect to the objects and vice versa so that a focal point of said image forming lens coincides with a peak Z-position detected by said peak position detecting means.

2. A shape detecting apparatus according to claim 1, wherein said perpendicular direction is parallel to the direction of said slit-like bright line projected into said plurality of objects.

3. A shape detecting apparatus comprising:
   a slit projector for projecting a slit-like bright line on a plurality of objects arranged in a line;
   a light segmented-image detecting head comprising an image forming lens for forming a bright line image from said slit-like bright line and a scanning type image detector for scanning said bright line image formed by said image forming lens to produce a corresponding video signal;
   a histogram forming means for forming for each frame a frequency distribution of a Z-coordinate in a direction of the height of said objects, representing the maximum value of the video signal at each X-coordinate in a direction arranged parallel to a direction of said slit-like bright line projected on said objects;
   a peak position detecting means for detecting a peak Z-position which provides a maximum in said frequency distribution formed by said histogram forming means; and
   automatic control means for relatively moving said light segmented-image detecting head with respect to the objects and vice versa so that a focal point of said image forming lens coincides with a peak Z-position detected by said peak position detecting means.

4. A shape detecting apparatus according to claim 3, wherein said slit projector is projected from the Z-direction to the objects, and wherein said light segmented-image detecting head is arranged so as to tilt in the Z-direction.

5. A shape detecting apparatus according to claim 3, wherein said slit projector is mounted on said light segmented-image detecting head.

6. A shape detecting apparatus according to claim 3, wherein said scanning type image detector comprises an image scanning means for scanning the bright line image obtained through the image forming lens in a direction of height of the objects and a one-dimensional image sensing device arranged in a direction perpendicular to the scanning direction of the image scanning means for scanning said bright line image formed by said image forming lens in said perpendicular direction.

* * * * *